July 23, 1940.  H. C. SMITH, JR  2,209,211
CIRCLE CUTTING ATTACHMENT FOR ROTARY SHEARS
Filed May 31, 1939  9 Sheets-Sheet 1

Witness:
Chas. R. Koursh

Inventor,
Henry Collier Smith Jr.
By Parkinson & Lane, Attys

July 23, 1940.  H. C. SMITH, JR  2,209,211
CIRCLE CUTTING ATTACHMENT FOR ROTARY SHEARS
Filed May 31, 1939  9 Sheets-Sheet 2

Inventor,
Henry Collier Smith Jr.
By Parkinson & Lane, Attys.

Witness:
Chas. L. Loursh

July 23, 1940.  H. C. SMITH, JR  2,209,211
CIRCLE CUTTING ATTACHMENT FOR ROTARY SHEARS
Filed May 31, 1939  9 Sheets-Sheet 3

Inventor
Henry Collier Smith Jr.
By Parkinson & Lane, Attys.

Witness:
Chas. R. Abrush

July 23, 1940.  H. C. SMITH, JR  2,209,211
CIRCLE CUTTING ATTACHMENT FOR ROTARY SHEARS
Filed May 31, 1939  9 Sheets-Sheet 4
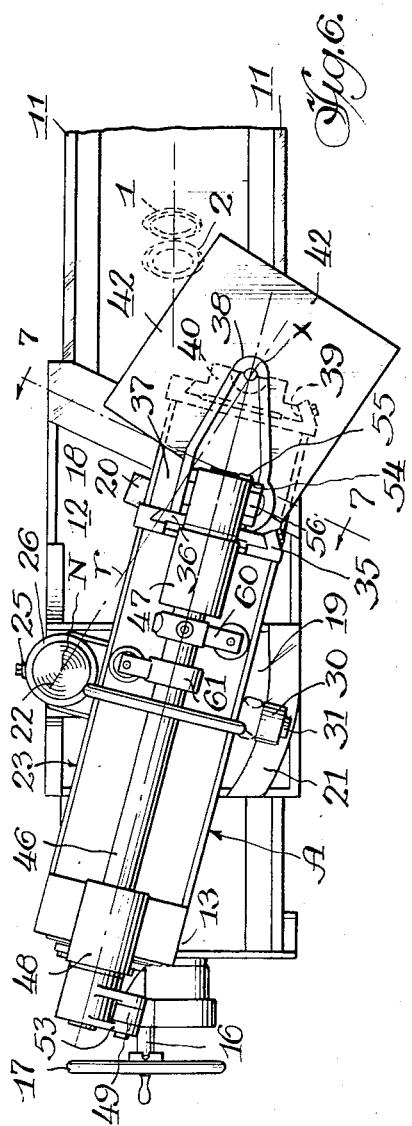
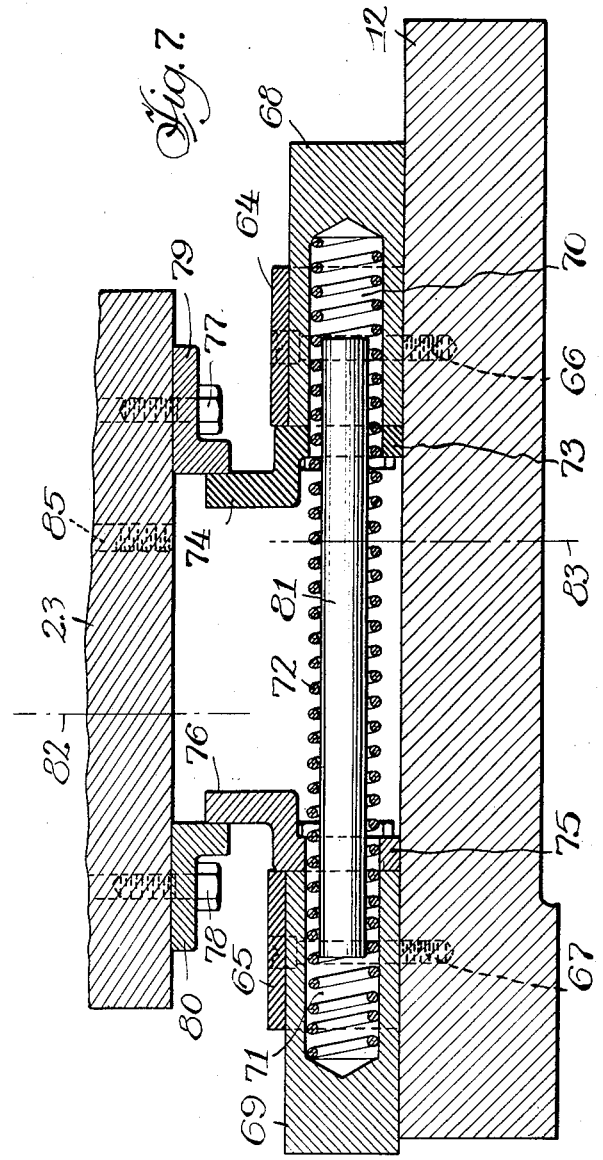
Inventor,
Henry Collier Smith Jr.
By Parkinson + Lane, Attys.
Witness:
Chas R Koursh

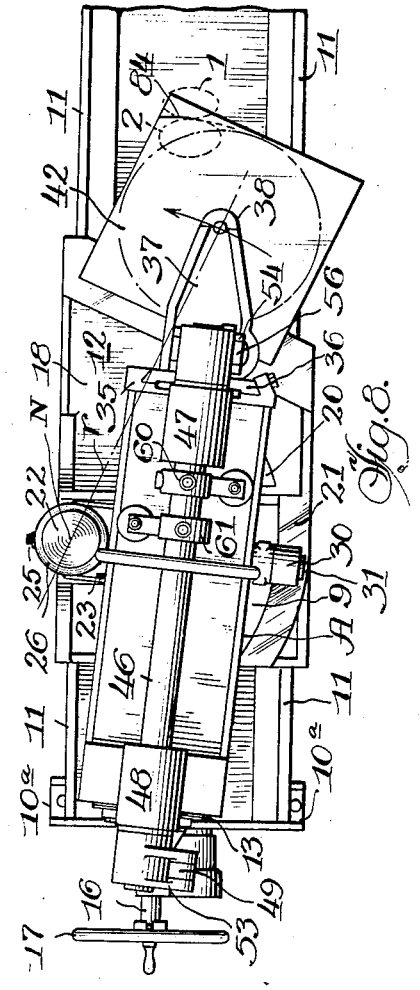

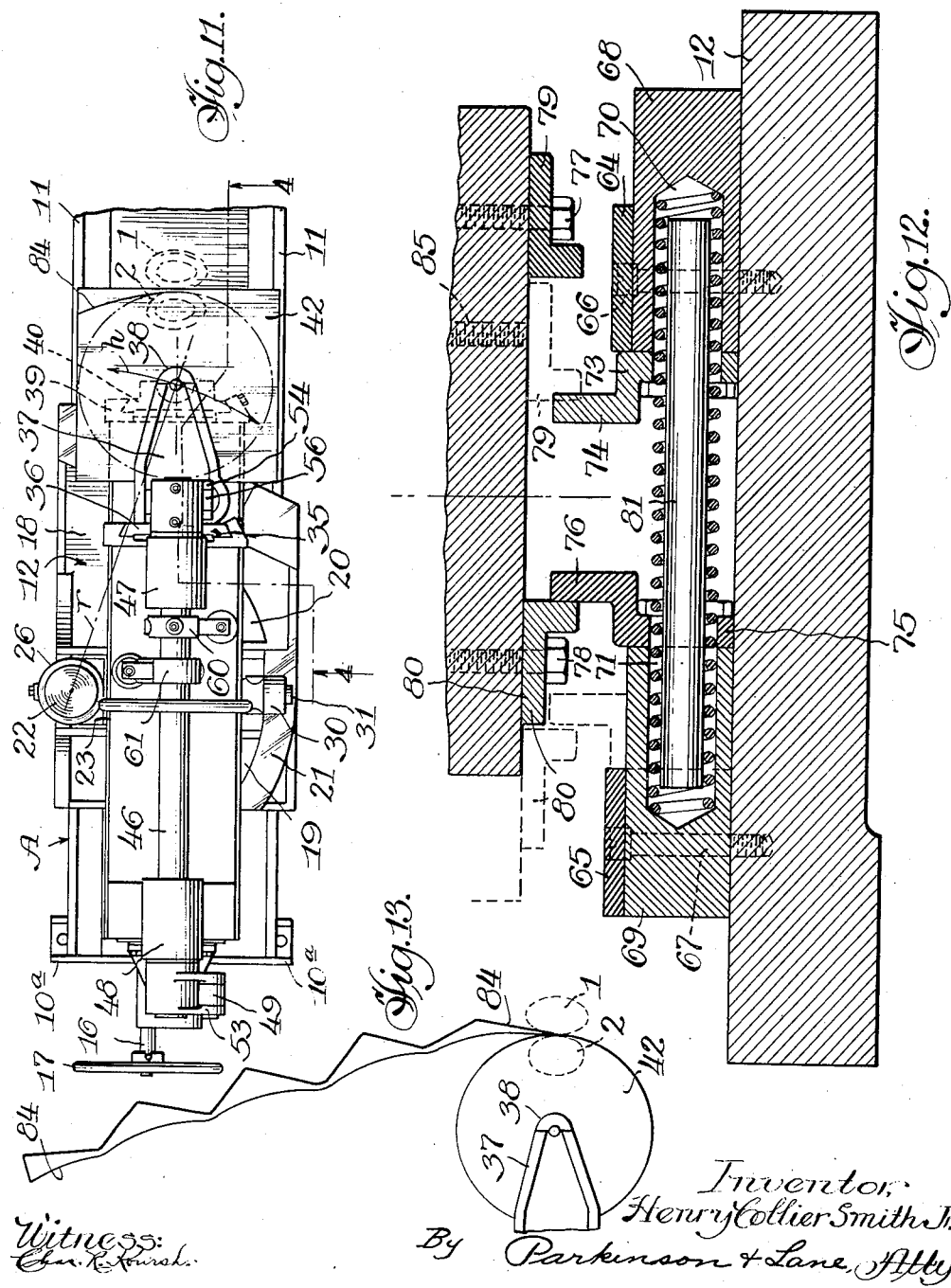

July 23, 1940. H. C. SMITH, JR 2,209,211
CIRCLE CUTTING ATTACHMENT FOR ROTARY SHEARS
Filed May 31, 1939 9 Sheets-Sheet 7
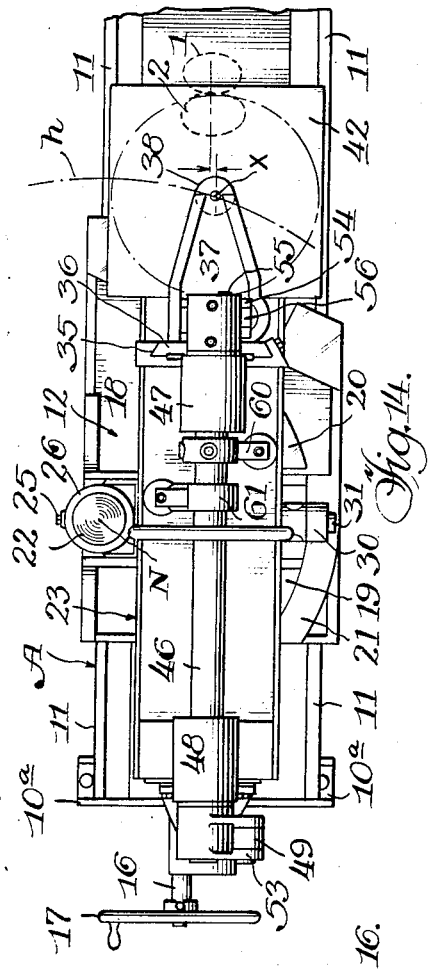
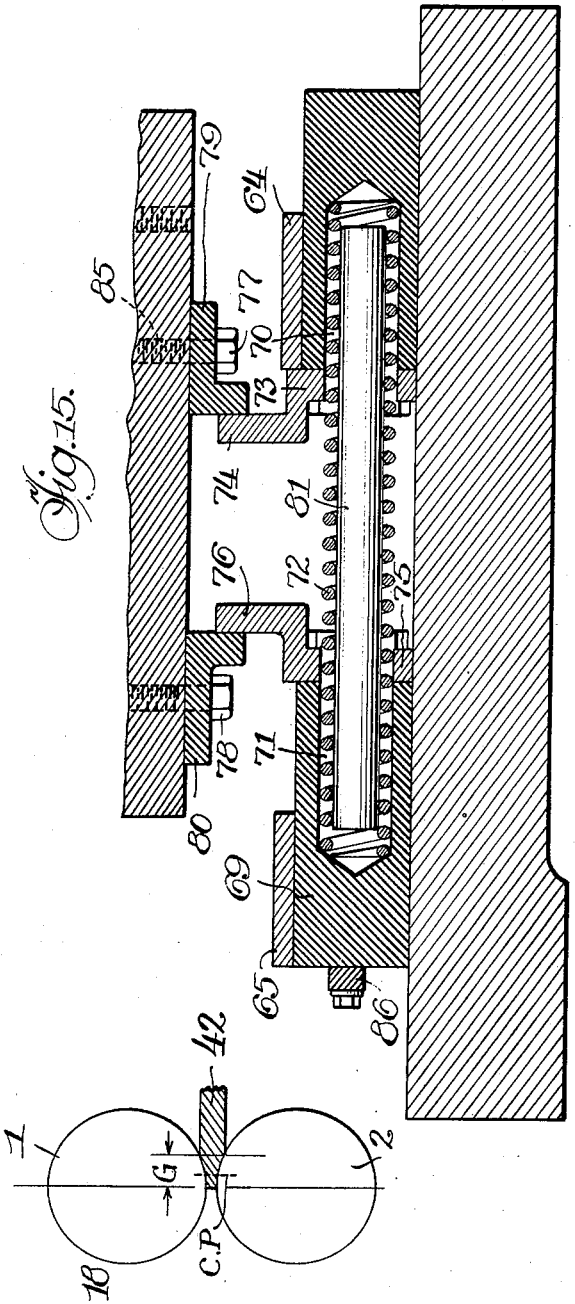
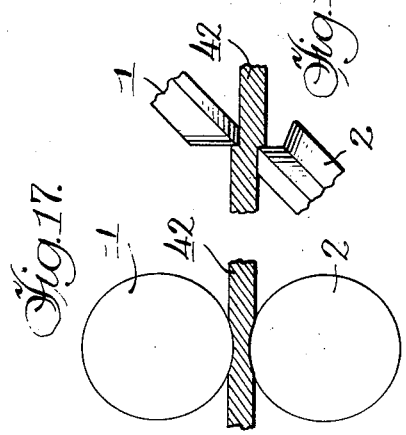
Inventor,
Henry Collier Smith Jr.
By Parkinson & Lane, Attys.
Witness:
Chas. R. Koursh.

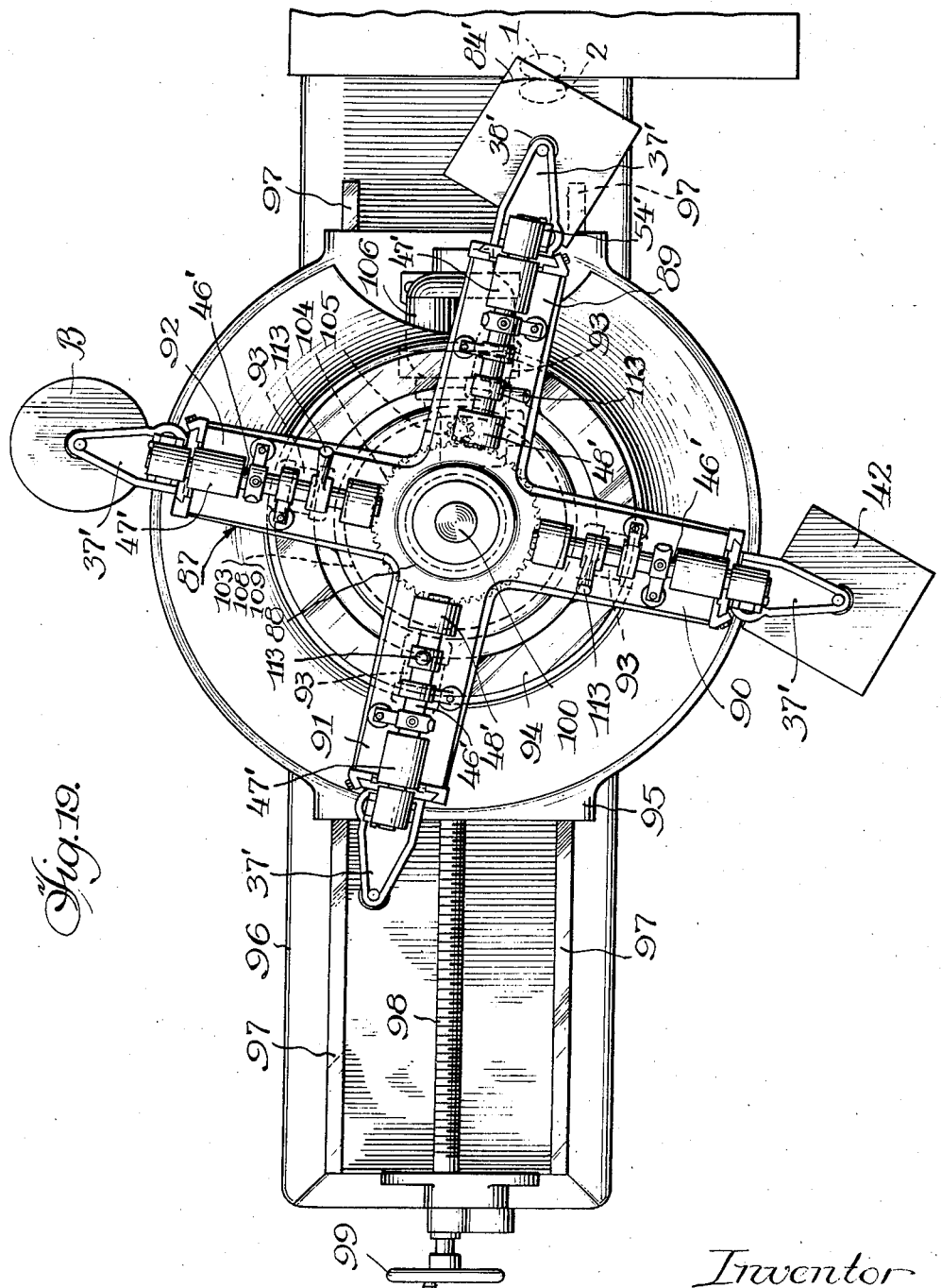

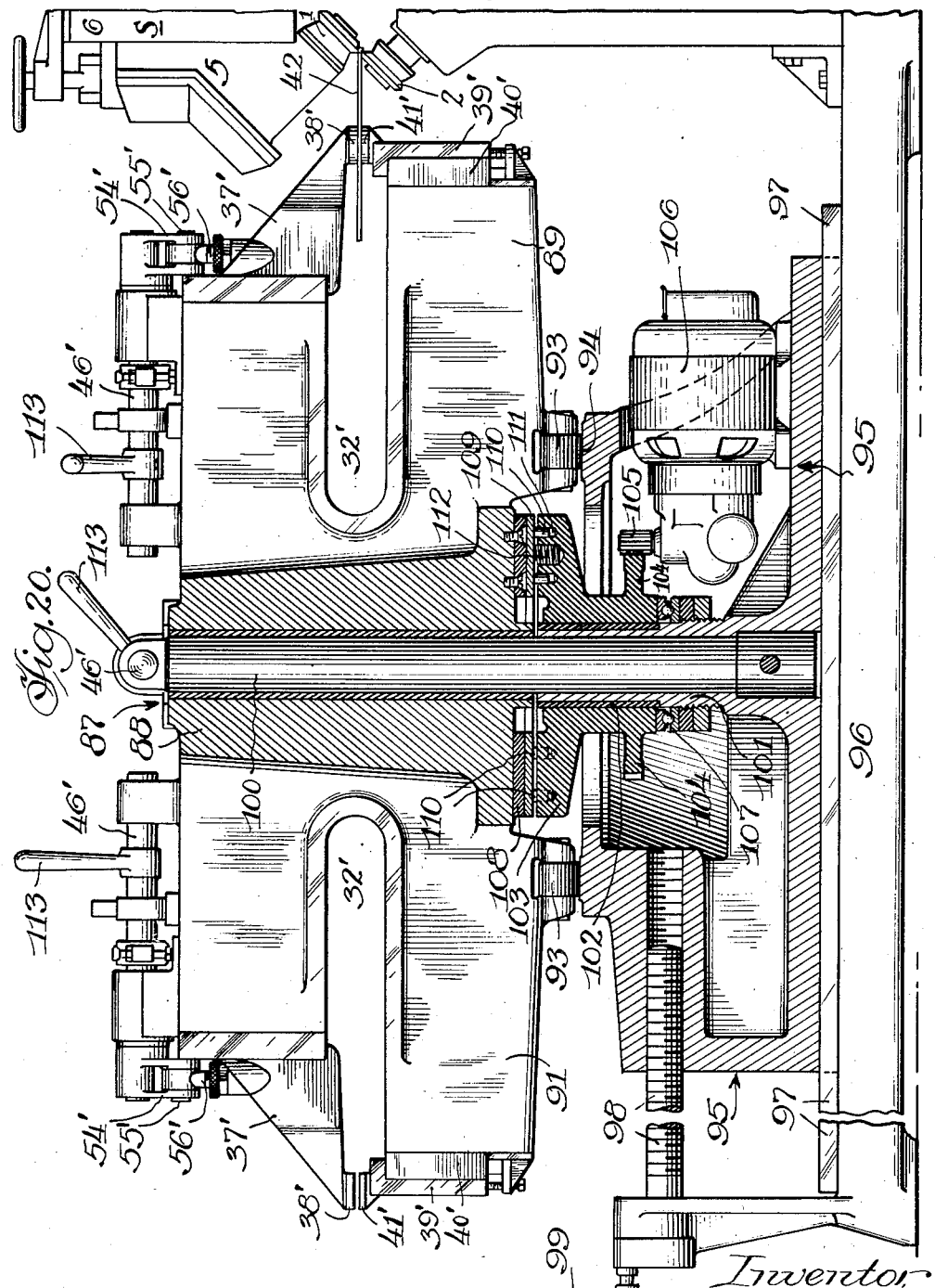

Patented July 23, 1940

2,209,211

UNITED STATES PATENT OFFICE 2,209,211

CIRCLE CUTTING ATTACHMENT FOR ROTARY SHEARS

Henry Collier Smith, Jr., Chicago, Ill., assignor to The Quickwork Company, Chicago, Ill., a corporation of Ohio Application May 31, 1939, Serial No. 276,494

19 Claims. (Cl. 164—63)

This invention relates to circle cutting attachments for rotary shears of the type in which the center of the workholders will during the cutting operation automatically be caused by the pull of the rotary cutters upon the blank to automatically move to proper position for cutting a true circle.

Among the objects of my invention is to provide means and arrangement of parts such as to eliminate the necessity of separating the rotary cutters upon completion of the cutting of a circle and to facilitate the easy removal of the scrap material remaining from the blank, and to simplify the operation of rotary shears and greatly increase their efficiency and adaptability, as well as to enable the blank to be more easily placed in proper position in the rotatable workholders because of said holders when the machine is not in operation upon a blank being automatically carried to one side of the machine in a position to be much more readily accessible to the operator.

A further object of my invention is to make possible the starting of the cut at one edge of the blank and progressing from said edge inwardly in a non-circular curve to a point on the circumference of the circle to be cut and thence cutting in the true circle desired, and to provide means enabling a greater latitude of movement and control in lateral swinging of the rotatable workholders and attachment frame.

Another object of my invention is to provide a machine of the class described which can be used in the manner referred to above for starting the cut at a point in one edge of the blank, and in addition can be readily converted for use in the standard way for first causing the cutters to pierce the blank sheet being cut and then cut a true circle without starting from the edge.

A still further object is the provision of novel means for clamping and holding the blank sheet between the rotatable workholders, and easily and quickly operable for either clamping the blank sheet between the workholders or removing the same therefrom upon completion of the cut.

Another object is to provide means for supporting against lateral twisting action the attachment frame and a circle cutting attachment for rotary shears.

A further object is to provide a multiple circular cutting attachment in which a finished circle part may be removed and a blank sheet placed in the machine simultaneously with the cutting of a circular part from the blank sheet being operated upon, and novel mechanism and parts for carrying this into effect.

Other objects, advantages and capabilities such as are inherent in my invention will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings:

Fig. 6 is a plan view of my improved circle cutting attachment and showing the attachment frame swung to position to receive a blank sheet, with a blank sheet applied thereto and ready to have its edge pushed into the rotary cutters.

Fig. 7 is a fragmentary vertical transverse section through the lower portion of the attachment fame and the spring control means positioned between the bottom of the attachment frame and the upper face of the supporting base and taken on the line 7—7 of Fig. 6, but omitting the upper portion of the attachment frame and its associated mechanism.

Fig. 8 is a view similar to Fig. 6 but showing the parts in position when the blank sheet has advanced a certain distance through the rotary cutters, but in which the cutting point has not yet reached the circumference of the true circle.

Fig. 9 is a view similar to Fig. 7 but showing the spring control and associated parts in a position corresponding to the position shown in Fig. 8 of the blank sheet.

Fig. 10 is a diagrammatic view showing the relation between the various parts when cutting a true circle.

Fig. 11 is a view similar to Fig. 8 but showing the blank sheet and associated parts as having advanced to bring the cutting point to the beginning of the circumference of the true circle to be cut.

Fig. 12 is a view similar to Fig. 9 but showing the control spring and associated parts in a position corresponding to that in Fig. 11.

Fig. 13 is a fragmentary diagrammatic view of the true circle disc at the completion of the cutting operation and when the scrap material is just ready to drop therefrom.

Fig. 14 is a view similar to Fig. 11 but showing my circle cutting attachment converted for use in the standard way of piercing the cutters into the blank sheet without starting the cut from the edge of said sheet.

Fig. 15 is a view similar to Fig. 12 but showing the parts so repositioned that my attachment may be used for piercing in the standard way and in the position corresponding to that of Fig. 14.

Fig. 16 is a fragmentary vertical longitudinal section through a portion of the blank sheet at the cutting point, with portions of the rotary cutters shown in the position they occupy at this cutting stage.

Fig. 17 is a view at right angles to Fig. 16 through the cutting point and showing a fragment of the blank sheet in transverse vertical section and showing the cutters circular instead of elliptical for convenience.

Fig. 18 is a view similar to Fig. 17 but showing the work just starting between the cutters.

Fig. 19 is a plan view of a modified form of circle cutting attachment for rotary shears embodying my invention but showing the same with multiple workholders.

Fig. 20 is a vertical longitudinal section taken on a median plane passing through the central rotating shaft of Fig. 19 and showing some of the parts in elevation for convenience.

Figure 1:
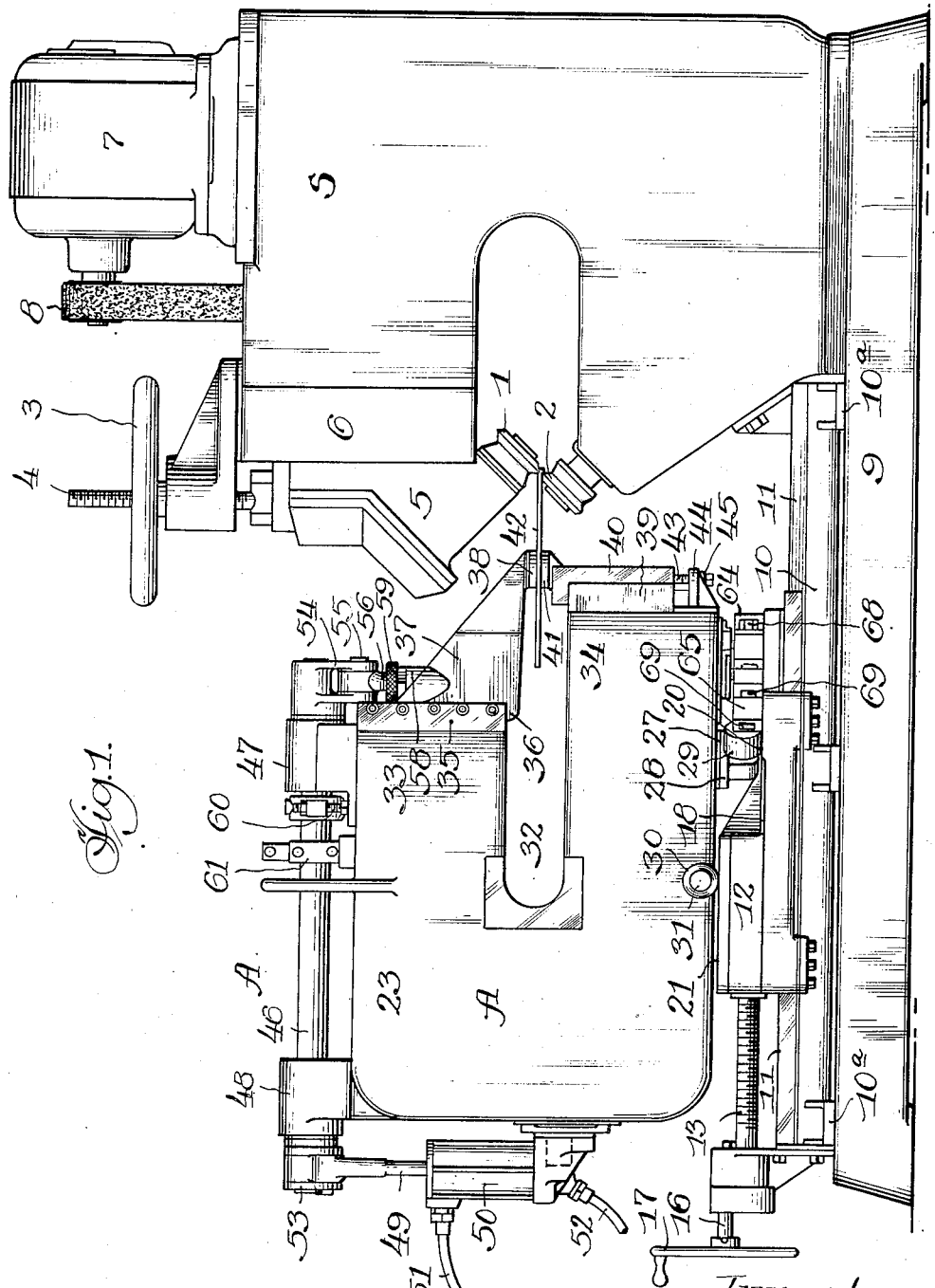
Fig. 1 is a side elevation of a rotary shear having operatively connected therewith a circle cutting attachment embodying my invention.

Referring in detail to the drawings and more particularly to Fig. 1, my improved circle cutting attachment designated generally at A, is shown operatively attached to a rotary shear indicated generally at S, comprising an upper rotary cutter 1 and a lower rotary cutter 2, which cutters are driven in the usual manner common to this type of machine, the upper cutter 1 being vertically movable in the usual manner by an adjusting wheel 3 and adjusting screw 4, which screw is fixed to the head 5 mounted for vertical sliding movement in the guideway 6. This rotary shear is provided with a motor 7 for operating the same through the medium of a belt 8 and suitable associated driving parts, which will not be here described in detail as the rotary shear does not constitute part of my invention except insofar as the same is combined generally with my circle cutting attachment.

The rotary shear S and circle cutting attachment A are mounted upon a base 9 in any suitable manner so as to bring them in proper co-operating relation to each other. The rotary shear S is fixedly mounted on base 9, whereas the circle cutting attachment A is slidable adjustably thereon, in the manner and for the purpose hereinafter more fully explained. It will be understood that in the rotary shear the rotary cutters 1 and 2 may be adjusted with relation to each other to any desired degree to effect the necessary cutting action, and adjustable for cutting various thicknesses of material.

Figure 2:
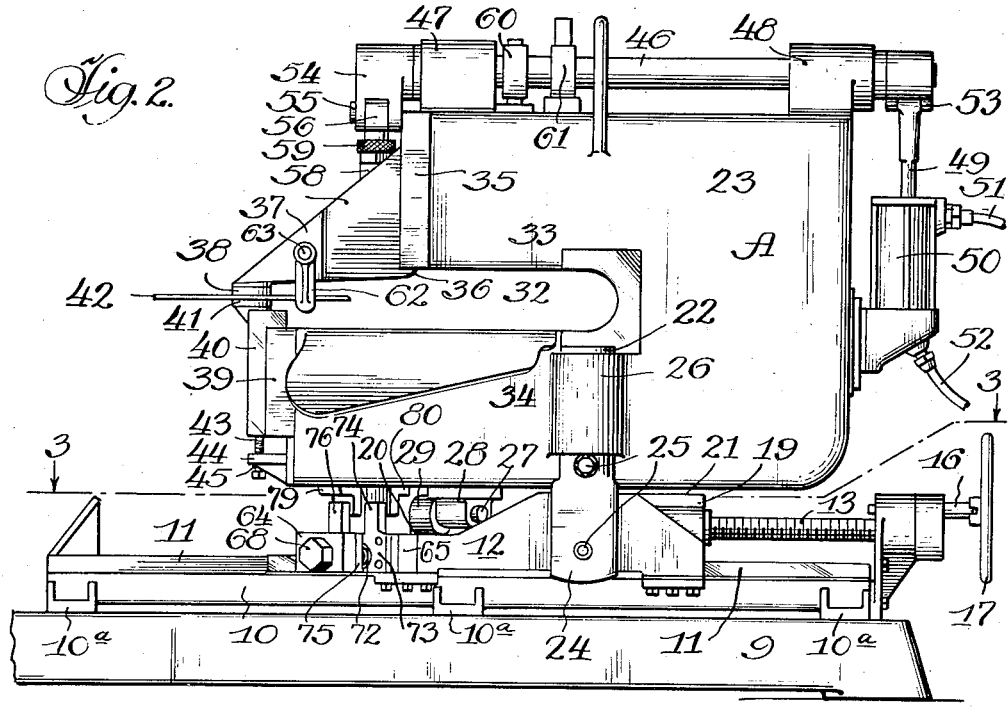
Fig. 2 is a side elevation of a circle cutting attachment embodying my invention but showing the reverse side from that shown in Fig. 1.
Figure 3:
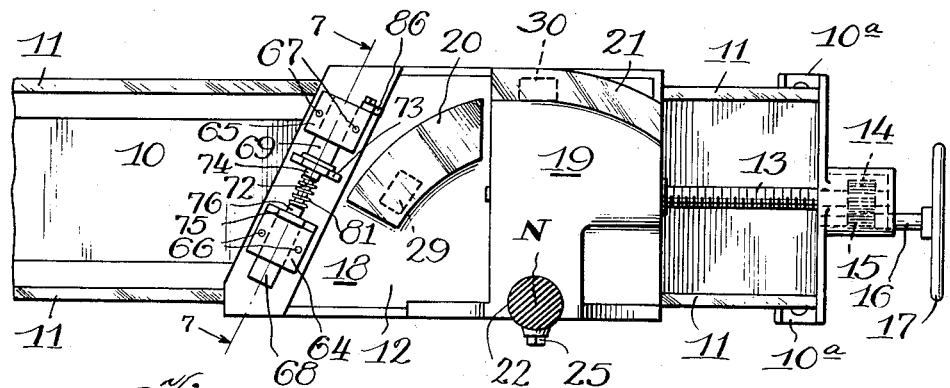
Fig. 3 is a longitudinal transverse section on the line 3—3 of Fig. 2 and looking in the direction of the arrows.
Figure 4:
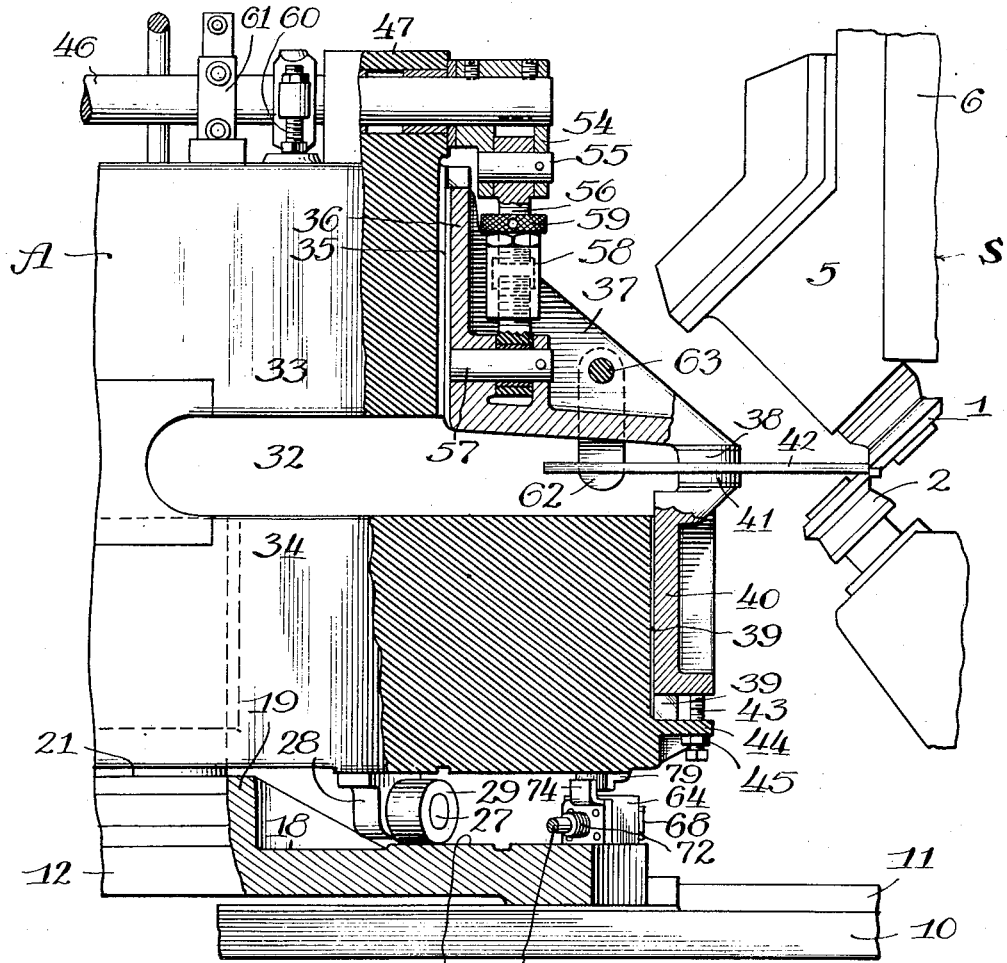
Fig. 4 is a fragmentary side elevation of the front portion of my circle cutting attachment with parts shown in section, and a fragmentary portion of the rotary shear showing the rotary cutters operating upon a blank sheet.

As seen in Figs. 1 to 4, the base 9 to one side of the rotary shear S is provided on its upper face with a superposed base member 10 secured in any suitable manner as, for example, by cross-bar 10a to the base 9, this superposed base member 10 comprising the longitudinal guideways 11, one on each side of the base 10, with which guideways are engaged complemental shaped runners formed in the bottom portion of the carriage 12, which carriage is slidable longitudinally of the frame 10 by means of the adjusting screw 13, which has threaded connection in a threaded aperture in carriage 12 in the manner generally shown in Fig. 2, so that as the adjusting screw is rotated the carriage will be moved in one direction or the other depending upon the direction of rotation. The adjusting screw 13 as shown in Fig. 3 is provided at its outer end with a gear wheel 14 meshing with pinion 15 fixed to shaft 16 rotated by wheel 17. As will be understood, rotation of wheel 17 will through the medium of the parts just described cause rotation of adjusting screw 13 in the desired direction. Pinion 15 preferably has a smaller number of teeth than gear 14 so as to give the desired power advantage to require less effort in rotating wheel 17.

The upper face of carriage 12 has a lower level 18 and an upper level 19, the lower level having formed thereon an arcuate flat trackway 20 and the upper level having formed thereon a flat arcuate trackway 21, for a purpose later more fully set forth. Fixed to the upper level 19 at one side of the carriage 12 and extending vertically therefrom, is the pivot pin 22 for pivotally mounting the attachment frame 23 to the carriage 12. This pivot pin 22 is provided with a flattened foot portion 24 secured to the side of the carriage by means of set screws, bolts or the like, 25, the upstanding upper end of this pivot pin being machined into a smooth cylindrical portion to have snug but rotatable engagement with a vertical cylindrical opening in the boss 26 formed integrally with the lower side portion of the attachment frame 23. The upstanding pivot pin 22 is formed at the lower end of boss 26 with a suitable shoulder, against which the lower end of boss 26 has rotatable sliding contact.

Pivotally mounted on a shaft 27 carried by block 28 fixed to the bottom of the attachment frame 23 is a roller 29 which has rolling contact with the flat arcuate trackway 20. These is also provided at a suitably spaced distance another roller 30 rotatably mounted on or with shaft 31, which shaft is either fixed to or rotatable with relation to the attachment frame 23 as desired. Roller 30 has rolling contact with the flat arcuate trackway. Rollers 30 and 29 are sufficiently spaced apart so as to prevent any combined stress between boss 26 and pivot pin 22, so that there will be free uncramped rotation therebetween. The attachment frame 23 is thus capable of a limited amount of lateral oscillation about pivot pin 22, as will later be more fully understood.

Attachment frame 23 is provided with the slotted throat portion 32 forming upper extension 33 and lower extension 34, the upper extension being shorter than the lower extension. Formed in the front face of upper extension 33 is a dovetail guideway 35, in which is vertically slidable a correspondingly shaped portion 36 of a vertically slidable upper clamping jaw 37, to the lower forward face of which is rotatably attached the upper rotatable workholder 38.

Formed in the forward face of the lower extension 34 is a pair of laterally spaced dovetail guideways 39 (see Figs. 1, 4, 6 and 11), in which is vertically slidable the adjustable lower clamping jaw 40 formed at its lateral edges with corresponding dovetail formation to slidably fit the dovetail recesses in guideway 39. Rotatably mounted at the top of clamping jaw 40 is the lower rotatable workholder 41. Jaw 40 is adjusted to the proper vertical height to bring the upper face of the lower workholder against the lower face of the blank sheet 42, from which the circle is to be cut, so that this sheet will be in the proper horizontal plane to be cut by the rotary cutters. The vertical adjustment of clamping jaw 40 is effected by screw 43 threadably engaging the flange 44 and provided with a locking nut 45 to positively hold clamping jaw 40 against movement in its adjusted position.

Figure 5:
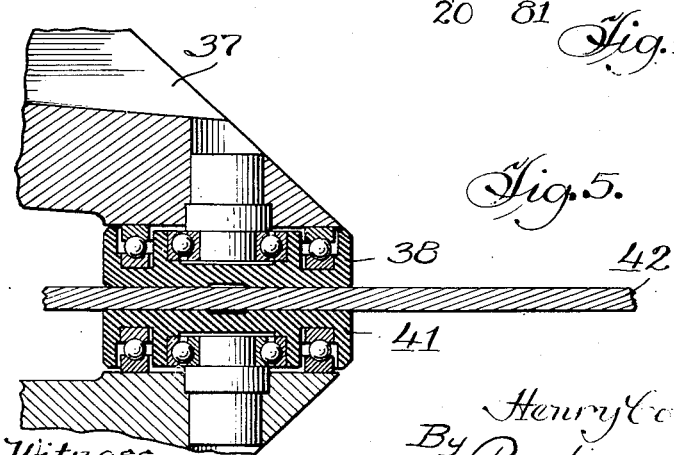
Fig. 5 is a fragmentary detail vertical longitudinal section taken on a median plane through the rotatable workholders and adjacent parts, and showing a portion of a blank sheet clamped between the workholders.

The upper and lower rotatable workholders 38 and 41 (between which the blank sheet is clamped) are provided with ballbearings shown in detail in Fig. 5, whereby these workholders may be freely rotatable when the blank sheet is clamped therebetween. The blank sheet 42 during the cutting operation is tightly engaged by those faces of the rotary cutters which are in engagement with the blank sheet, so that rotation of the rotary cutters during the cutting operation will cause rotation of the blank sheet 42, which latter rotation is permitted by the ballbearings in the upper and lower workholders, the blank sheet being at the same time firmly clamped between these workholders.

To permit the blank sheet 42 to be placed in position between the workholders, the upper clamping jaw 37 is movable toward and away from clamping position by means of shaft 46 mounted in bearings 47 and 48, and rotatable by the piston rod 49 actuated by a piston in the hydraulic cylinder 50, which is provided with flexible piping 51 and 52 to conduct oil, water, air or other fluid to both sides of the piston in hydraulic cylinder 50, suitable control means being provided to effect movement of the piston and piston rod 49 upwardly and downwardly as desired. Piston rod 49 is pivotally connected at its upper end to arm 53 rigidly formed on shaft 46, whereby up and down movement of the piston rod will cause an oscillating movement of said shaft. Fixed to the forward end of shaft 46 is an arm 54 which has pivotal connection at 55 with a connecting rod 56, which at its lower end is pivotally connected with shaft 57 mounted in the upper clamping jaw 37, so that as arm 54 is moved up and down by partial rotation of shaft 46 the upper clamping jaw 37 will likewise be moved up and down to bring the upper workholder 38 either into clamping position against the work or move it away therefrom as desired in the operation of the machine.

The connecting rod 56 is provided with a turnbuckle 58 cooperating with spaced threaded ends of the connecting rod, whereby the effective length of the connecting rod may be varied by rotating said turnbuckle the desired amount, after which it is locked in place by the lock nut 59. This structure is clearly shown in Fig. 4. Adjustable stop members 60 and 61 (see Figs. 1 and 4) are provided on shaft 46 to adjustably limit the amount of partial rotation of shaft 46, whereby all that is necessary is to apply power to the hydraulic cylinder 50 until one or the other of these adjustable stops contacts a stationary stop on the top of the attachment frame 23.

From the structure above described it will be understood that the upper rotatable workholder can be brought into clamping engagement with the blank sheet 42 by applying power to the hydraulic cylinder 50 to hold the blank sheet clamped in proper position during the cutting operation, and moved upwardly away from this sheet by applying power to the hydraulic cylinder in the opposite direction upon completion of the cutting operation. Due to the adjustable nature of stops 60 and 61 they may be positioned as desired to permit any amount of movement of shaft 46 and upper clamping jaw 37 as required for carrying out the operation of the machine on a blank sheet of any thickness within the capacity of the machine. To assist the operator in quickly positioning the work to bring the center of the blank sheet 42 substantially coincident with the vertical axis of rotation of the rotatable workholders 38 and 41 when placing this blank sheet in the machine, I have provided the gauge stop 62 which, after serving its purpose for quickly locating the position of the sheet, may be swung about its pivot 63 upwardly so that the blank sheet 42 will clear the same during its rotation while being cut. As will be understood, the throat 32 in the attachment frame 23 will be made sufficiently long to accommodate the maximum width of blank sheet to be operated upon.

When plate metal is sheared with rotary cutters of the type used in the present machine, the metal is completely sheared before it reaches the center of the cutters, the cutting point being located somewhere in g (see Fig. 18), this cutting point being designated for the sake of illustration on the line CP in Fig. 18, the exact location of this cutting point, however, varying in distance from the center of the cutters by reason of difference in cutter diameters, difference in cutter settings, and metal thicknesses. It is impossible to locate this cutting point visually or by hand measurements, but in order to cut a true circle the center of rotation of the blank sheet (designated at X in Fig. 10) must be located in accordance with the following rule and by reference to Fig. 10, in which A, B designates the straight cutting line, X the center of rotation of the blank sheet N, the axis of the attachment frame pivot 22, and the line e, f, the center line of the machine, the arrow h representing the arc of travel of center X upon the radius r having N as its center, and line g being parallel with the center line e, f of the machine. The rule referred to is:

The sheet out of which the circle is being cut must have its center revolvably held in an imaginary line drawn at 90° from the straight cutting line, this 90° line intersecting the straight cutting line at the cutting point of the cutters.

For illustrative purposes, the 90° line intersecting the straight cutting line at the cutting point of the cutters is designated in Fig. 10 at g, which, as will be understood, will cause the center of the blank sheet to fall at the point X in Fig. 10. The nature of my machine is such as to automatically by virtue of the pivotal mounting of the attachment frame on the pivot post 22 cause the center X of the blank sheet and the perpendicular line g to fall in the right positions to effect the cutting of a true circle as the blank sheet rotates about the center X. In the description just given of the position of parts for the cutting of a true circle it is presumed that the upper rotary cutter has been moved upwardly away from the lower cutter a distance to permit the blank sheet to be inserted between these cutters, and the upper cutter then lowered to cutting position. In the present invention I have provided means for permitting the cut to be started at the edge of the blank sheet, the cutting line following inwardly of the sheet as the cut proceeds until the cutting point reaches the circumference of a true circle, which will then bring the parts into the relation just described in connection with Fig. 10, after which continued cutting will cut a true circle in the sheet of metal being operated upon. I will now describe the mechanism by which this starting of the cut in from the edge of the blank sheet may be effected.

Referring to Figs. 6 to 15, it will be seen that I have provided on the forward edge of the slidable carriage 12 upon which the attachment frame 23 is mounted, an angularly positioned spring assembly shown in plan view in Fig. 3, and properly positioned laterally of the carriage to enable the device to work within the limits of the machine. This spring assembly comprises the hollow stationary guide members 64 and 65 secured to the carriage at their opposite sides by stud bolts or the like 66 and 67 respectively. Slidably mounted in the guide member 64 is a block 68 and slidably mounted in guide member 65 is a block 69. Each of these blocks is of such exterior configuration to snugly but freely slide in the opening of the respective guide members, and each block is formed with an opening 70 and 71 respectively. Extending between blocks 68 and 69 and positioned at its respective ends in the hollow exteriors of these blocks, is a compression coil spring 72 abutting at its ends against the metal forming the ends of the hollow interiors 70 and 71. The compression in spring 72 is chosen within the working limits of the device but is not required to meet precise and minute specifications in this regard.

Secured by bolts or the like to the hollow open end of sliding block 68 is an extension 73 formed with an upstanding stop member or projection 74, while a corresponding extension 75 provided with an upstanding stop member or projection 76 is likewise secured to the slidable block 69. As noted in Fig. 7, the extension 73 at its upper end extends above the top of the sliding block 68 so as to at its right-hand limit of movement strike the guide member 64. Extension 75 is likewise formed so as to strike the guide member 65 at its left-hand limit of movement. Secured to the forward end of the bottom of the attachment frame 23 by bolts or the like 77 and 78 respectively, is a pair of stop brackets 79 and 80 spaced apart as shown in Fig. 7 such distance laterally of the attachment frame as to be in contact with the upstanding projections 74 and 76 when these projections are at their widest limit of movement and each in contact with its guide member 64 and 65 respectively.

Positioned within coil spring 72 is a longitudinally extending pin 81 of sufficient length to prevent buckling or bending out of a straight line of spring 72 so as to keep this spring in proper alignment with the interior openings in sliding block 68 and 69. The parts just described are shown in Fig. 7 in the position they will occupy when the forward end of the attachment frame is swung laterally as shown in Fig. 6 to have a blank sheet placed in position between the rotatable workholders 38 and 41. After the blank sheet has been properly secured and clamped between the rotatable workholders 38 and 41, through the medium of the upper clamping jaw, as described earlier herein, the operator pushes manually laterally upon the forward end of the attachment frame or upper clamping jaw as most convenient, to swing the attachment frame about its pivot 22 and carry the blank sheet 42 toward the rotary cutters. In Fig. 7 the vertical center line or axis of the rotatable workholders is designated by the broken line 82, and a vertical center line piercing the longitudinal axis of the base is designated by the broken line 83.

Figs. 8 and 9 show the position of the parts after the attachment frame has been swung laterally a sufficient distance to move the edge of the blank sheet into the bite of the rotary cutters and after the rotary cutters have cut partway into the sheet. When in this position it will be seen in Fig. 9 that the sliding block 69 has moved through the guide member 65 by reason of stop bracket 80 (which moves with the attachment frame) contacting and pushing the upstanding stop member 76 to the right. This further compresses the spring 72. At the same time the stop bracket 79 has moved a corresponding distance to the right away from the upstanding stop member 74, which latter is prevented from movement because of its contact with the guide member 64.

As seen in Fig. 9, the vertical line 82 has moved nearer to the vertical line 83. In Figs. 11 and 12 the parts are shown in the position at which the cutting point of the rotary cutters has reached the circumference of the true circle to be cut in the blank sheet, the cutters having thus traversed the distance from the edge of the sheet to the circumference of said circle, and in the meantime have cut the slit 84 in the blank sheet. When the parts are in this position it will be seen in Fig. 12 that stop bracket 80 has carried the upstanding stop member 76 further to the right because of the further swinging in this direction of the attachment frame under the pull exerted upon the blank sheet by the pressure exerted on both sides of said sheet by the rotary cutters during their rotating cutting movement, which comes into play immediately upon the starting of the edge of the blank sheet between the rotary cutters. This pull exerted upon the blank sheet by the rotary cutters will continue until the cutting point has reached the circumference of the true circle to be cut in the blank sheet.

As soon as this point is reached by the cutters the blank sheet 42 will begin to rotate upon the axis of the rotatable workholders under the pull of the rotary cutters upon the blank sheet. At this time the imaginary line referred to above in the rule stated earlier herein has reached a position at 90° from the straight cutting line, and at the same time is intersecting the straight cutting line at the cutting point of the cutters. The rotation of the blank sheet about the axis of the rotatable workholders will continue, together with the cutting action, the line cut following a true circle with said axis of the rotatable workholders as the center. As soon as the circle is completed the scrap metal shown in Fig. 13 will drop away, leaving the finished work with its exterior in the form of a true circle. The finished work is then removed from the machine by suitable operation of the hydraulic cylinder 50 to release the upper clamping jaw, after which a fresh blank sheet is placed therebetween and the upper clamping jaw clamped thereagainst for the cutting of another true circle. This will be continued with the production of any desired number of finished articles in the form of a true circle.

Another important feature of my machine is the fact that it can be readily and quickly converted into a machine for cutting circles in the standard way by elevating the top rotary cutter and by means of the hand-wheel 3 causing it to pierce through the blank sheet in the old way rather than cutting it from the edge as in my present invention. This conversion of the machine from edge cutting to piercing is effected by removing the bolt 77 from stop bracket 79 and moving the latter to the left as shown in Fig. 15 into position so that the bolt 77 can be secured in place in a different opening 85 from that previously occupied. This positions the parts as shown in Fig. 15, it being further explained that the parts are held in this position by moving pivotally or otherwise a plunger stop 86 behind the left-hand end of the sliding block 69, so as to hold this block against any movement to the left as viewed in Fig. 15. This will hold the parts as shown in Fig. 15, which will permit any necessary slight swinging of the attachment frame about its pivot to the right as shown in Fig. 15 (this being permitted by compression of spring 72), so as to permit the automatic positioning of radius g (see Fig. 10) at right angles to the straight cutting line with its center at X, and this radius intersecting the cutting point so as to insure the cutting of a true circle as described earlier herein.

As will be understood in connection with Figs. 6 to 9 and 11 and 12, which forms are for cutting in from the edge of the blank sheet, as soon as the true circle has been cut in the blank sheet, which necessarily frees any further pulling of the rotary cutters upon the blank sheet, the finished work together with the forward end of the attachment frame will swing under action of spring 72 to the left into position for ready removal by the operator of the finished work and the insertion into the machine of a new blank sheet, after which a push by the operator against the upper clamping jaw will move the work to bring the edge of the blank sheet into the rotary cutters and to carry out the cutting operation described above. In other words, the action of spring 72 normally holds the clamping jaws and the work gripped therebetween away from the cutters, but will permit movement of the same to bring the edge of the sheet between the cutters, after which the pull of the cutters upon the sheet will from then on produce the necessary movement of the sheet which, as stated above, will be rotary about the axis of the rotatable workholders as soon as the cutting point reaches the circumference of the true circle to be cut. The pull of the cutters upon the blank sheet will hold the parts in the position shown in Fig. 12 against the action of spring 72, this position being the one for cutting a true circle, and after the cutting of the true circle has been completed the spring 72 will move the finished work to the left as described above.

In Figs. 19 and 20 I have shown a modified form of my circle cutting attachment, in which I have provided a rotatable attachment frame indicated generally at 87, in which is provided a hub portion 88 carrying a plurality of arms 89, 90, 91 and 92, positioned approximately 90° apart and each having at its lower end a roller 93 for antifriction movement upon a circular track 94 formed in the slidable carriage 95 positioned for sliding movement upon a base 96 formed with guideways 97, the longitudinal movement of the attachment frame with relation to the guideways being effected by an adjusting screw 98 through the medium of a hand-wheel 99 with associated parts similar to those for effecting longitudinal sliding movement of the attachment frame 23 in the preferred form, and operating in a similar manner to move the carriage 95 longitudinally with relation to the base 96 for accommodating the cutting of blanks of different diameter. This longitudinal movement will, as is obvious, carry the axis of the rotatable workholders 38' and 41' closer to or farther away from the rotary cutters, thus enabling the cutting of blanks of different diameter.

Mounted in the carriage 95 is, as shown in Fig. 20 of this modification, an upstanding shaft 100 held in vertical position by the upstanding hub 101 of carriage 95. Surrounding the hub 101 is a stationary bearing metal sleeve 102, upon which is rotatably mounted the driving member 103, upon which is formed the gear wheel 104 driven by pinion 105, which in turn is driven through suitable gearing from motor 106. Below driving member 103 is suitably positioned a stop bearing 107 with appropriate connections with the hub 101 for taking the thrust of the driving member 103. The lower face of the upper hub 88 has secured thereto by screws or the like a clutch facing 108, while the upper face of the driving member 103 has floatingly secured thereto a clutch plate 109 for frictional driving contact with the clutch facing 108 when the driving member is being driven as explained hereinafter. Clutch plate 109 is held against circumferential slipping with relation to the top face of the driving member 103 by reason of pins 110, which are vertically slidable in openings 111 in the upper face of the driving member. These pins are secured to the clutch plate and while they prevent circumferential slipping they permit a slight amount of vertical movement under action of springs 112 mounted in corresponding openings in the upper face of the driving member. This driving connection between driving member 103 and the hub 88 of the rotary attachment frame is such as to cause rotation of the attachment frame with its four radially extending arms until the blank sheet 42 is brought into contact with the rotary cutters, after which only such rotational movement of the attachment frame is permitted as to bring the blank sheet 42 into the proper position for cutting a true circle, after which slipping will occur between the clutch plate 109 and the clutch facing 108, thus permitting the driving member 103 to continue to rotate while the attachment frame remains stationary until after completion of the cutting of the true circle, when the rotation of the attachment frame will again be picked up by the clutch facing and continued until the next blank sheet to be cut is brought into contact with the rotary cutters. The upper clamping jaw 37' is caused to slide vertically upward to release the blank sheet after being cut, and downwardly to clamp the blank sheet in position for cutting by a shaft 46' mounted on the upper face of each of the radial arms of the attachment frame 87, the main difference between the upper clamping jaw operating mechanism in this modification over that shown in the preferred form being that in the modification the shaft 46' is rotated by means of a hand lever 113, and when the upper clamping jaw 37' is in its lowermost clamping position the connecting rod 56' will be slightly beyond dead center of the crank arm 54', whereby the clamping jaw will be held in clamping position until released by handle 113. Otherwise the operation of the upper clamping jaw in this modification is similar to that described above in connection with the preferred form.

In this modification it will be seen in Fig. 19 that the blank sheet 42 may be placed in position between the clamping jaws nearer within the zone represented at the lower part of Fig. 19, and upon completion of the true circle cutting of the true circle in the preceding blank sheet this newly loaded blank will move into position to be cut by the rotary cutters by virtue of the rotation of the attachment frame, and at the same time the finished blank B will move into the zone indicated at the upper portion of Fig. 19, where it can be removed by an operator, leaving the jaws from which the finished work has been removed available to have a new blank sheet placed therebetween as soon as these jaws spring to the other side of the machine. This enables continuous operation of the machine by having the blank sheets clamped into position upon one side successively as the arms come into that position, the cutting taking place as the blank sheet passes into the cutting zone and the finished work removed as soon as the cutting is completed and the arms moved away from the cutters. Otherwise the action of this modification is the same as that of the preferred form in the matter of the automatic movement under the pull of the cutters of the blank sheet into position for the cutting of a true circle therein.

It is also to be understood that in this modification the cut will start into the blank sheet from the edge as described in connection with the preferred form, thus eliminating the necessity and loss of time of elevating the upper rotary cutter to permit removal of the work, and subsequent lowering of the same on to a new blank sheet. The cut in from the edge of the blank sheet in Fig. 19 is indicated at 84'.

Having now described my invention, I claim:

1. In a circle cutting attachment for rotary shears, a base, an attachment frame pivotally mounted on said base for lateral swinging movement, rotatable workholders on said frame, anti-friction means on the base and frame for movably supporting the overhanging weight of the frame with relation to the frame pivot, resilient means for normally swinging the frame laterally to loading position and permitting it to be moved by the cutting pull of the rotary shears into position to cut a true circle in the blank being operated upon.

2. In a circle cutting attachment for rotary shears having rotary cutters, a base, an attachment frame rotatably mounted upon the base, rotatable workholders for clamping a blank sheet in position to be moved edgewise between the rotary cutters to cut the sheet from one edge to a point on the circumference of the true circle to be cut from the sheeet and from thence to cut the true circle, the marginal scrap dropping free upon completion of cutting the true circle, the finished work being swingable laterally free from the cutters, and resilient means to normally swing the finished work laterally away from the cutters.

3. In a circle cutting attachment for rotary shears having rotary cutters, a base, an attachment frame rotatably mounted upon the base, rotatable workholders for clamping a blank sheet in position to be moved edgewise between the rotary cutters to cut the sheet from one edge to a point on the circumference of the true circue to be cut from the sheet and from thence to cut the true circle, the marginal scrap dropping free upon completion of cutting the true circle, the finished work being swingable laterally free from the cutters, and resilient means to normally swing the finished work laterally away from the cutters, said resilient means permitting the blank sheet to be moved laterally into the cutters and to be overcome during the cutting of the true circle.

4. In a circle cutting attachment for rotary shears having rotary cutters, a base, an attachment frame swingably mounted on the base and adapted to have a blank sheet rotatably clamped therein so that the cutters will cut a true circle in the sheet, and means for automatically causing the cutters to cut a slit from one edge of the sheet in a non-circular curve from the edge to the circumference of the true circle, and then cut a slit in the sheet in the form of a true circle.

5. In a circle cutting attachment for rotary shears having rotary cutters, a base, an attachment frame swingably mounted on the base and adapted to have a blank sheet rotatably clamped therein so that the cutters will cut a true circle in the sheet, means for automatically causing the cutters to cut a slit from one edge of the sheet in a non-circular curve from the edge to the circumference of the true circle, and then cut a slit in the sheet in the form of a true circle, and resilient means for moving the finished work laterally away from the cutters upon completion of the work, the cutters remaining in their cutting relation to each other during the entire operation.

6. In a circle cutting attachment for rotary shears having rotary cutters, a base, an attachment frame mounted on the base for lateral swinging with relation thereto, arcuate trackways on the base, anti-friction means on the frame for movement on the trackways, the axis of rotation of the frame with relation to the base being on one side of the longitudinal center of the base, rotatable workholders for clamping a blank sheet in the frame in such manner that the cutters will cut a true circle in the sheet, the cut starting from one edge of the sheet while the cutters remain in cutting relation to each other.

7. In a circle cutting attachment for rotary shears having rotary cutters, a base, an attachment frame mounted on the base for lateral swinging with relation thereto, arcuate trackways on the base, anti-friction means on the frame for movement on the trackways, the axis of rotation of the frame with relation to the base being on one side of the longitudinal center of the base, rotatable workholders for clamping a blank sheet in the frame in such manner that the cutters will cut a true circle in the sheet, the cut starting from one edge of the sheet while the cutters remain in cutting relation to each other, and resilient means for moving the finished work laterally away from the cutters, with the cutters still remaining in cutting position with relation to each other.

8. In a circle cutting attachment for rotary shears having rotary cutters, a base, an attachment frame, means for pivotally mounting the frame on the base for limited lateral swinging with relation thereto, anti-friction supporting means for carrying part of the weight of the frame and preventing cramping action on the pivotal mounting, the pivotal mounting being to one side of the longitudinal center line of both the base and the frame, rotatable workholders for clamping a blank sheet in rotatable position in the frame for edgewise movement between the cutters whereby when the cutters have cut partway from the edge into the sheet the cut from then on will be a true circle, a spring at the forward portion of the base, and connections between said spring and the frame so biased by the spring as to normally move the finished work laterally away from the cutters upon completion of the cut.

9. In combination in a sheet metal working machine, a pair of rotary cutters, a base, a carriage slidably mounted above said base, means to move the carriage longitudinally of the base when desired and to hold it against such movement at other times, an attachment frame, pivot means for pivotally mounting the frame on the carriage so as to be laterally swingable thereon, a pair of rotatable workholders adapted to clamp therebetween a sheet to be operated upon, the workholders being located between the rotary cutters and the pivot means and to one side of a line connecting the cutting point and the pivot means, the frame being swung by the pull of the cutters on the sheet so as to automatically hold the sheet in position for cutting a true circle, the sheet being movable into the cutters edgewise, and spring means held under a strain during the cutting operation and moving the finished work laterally away from the cutters upon completion of the cut.

10. In combination in a sheet metal working machine, a pair of rotary cutters, a base, a carriage slidably mounted above said base, means to move the carriage longitudinally of the base when desired and to hold it against such movement at other times, an attachment frame, pivot means for pivotally mounting the frame on the carriage so as to be laterally swingable thereon, a pair of rotatable workholders adapted to clamp therebetween a sheet to be operated upon, the workholders being located between the rotary cutters and the pivot means and to one side of a line connecting the cutting point and the pivot means, the frame being swung by the pull of the cutters on the sheet so as to automatically hold the sheet in position for cutting a true circle, the sheet being movable into the cutters edgewise, and spring means held under a strain during the cutting operation and moving the finished work laterally away from the cutters upon completion of the cut, at which time the cut-off scrap of the sheet falls free from the finished work and cutters, and means on the frame contacting means on the spring for distorting the spring as the frame is swung sidewise to carry the sheet edgewise into the cutters.

11. In combination in a sheet metal working machine, a pair of rotary cutters, a base, a carriage slidably mounted above said base, means to move the carriage longitudinally of the base when desired and to hold it against such movement at other times, an attachment frame, pivot means for pivotally mounting the frame on the carriage so as to be laterally swingable thereon, a pair of rotatable workholders adapted to clamp therebetween a sheet to be operated upon, the workholders being located between the rotary cutters and the pivot means and to one side of a line connecting the cutting point and the pivot means, the frame being swung by the pull of the cutters on the sheet so as to automatically hold the sheet in position for cutting a true circle, the sheet being movable into the cutters edgewise, and spring means held under a strain during the cutting operation and moving the finished work laterally away from the cutters upon completion of the cut, at which time the cut-off scrap of the sheet falls free from the finished work and cutters, and means on the frame contacting means on the spring for distorting the spring as the frame is swung sidewise to carry the sheet edgewise into the cutters, said last mentioned means comprising slide-blocks, and stop means for limiting the extent of movement of the blocks.

12. In combination in a sheet metal working machine, rotary cutters, a carriage, an attachment frame swingably mounted on the carriage for moving the work to and away from the cutters, a pair of spaced apart slide-blocks on the carriage, a spring tending to move said blocks apart, stops for limiting the last mentioned movement, spaced brackets on the frame, and stop members on the blocks adapted to contact the brackets to normally hold the end of the frame swung away from the cutters but permit it to be swung toward the cutters to carry the work edgewise into the cutters.

13. In combination in a sheet metal working machine, rotary cutters, a carriage, an attachment frame pivotally mounted on the carriage, work supporting jaws on the frame, spaced stops on the frame, a spring on the carriage, and stops on the spring, the spring stops and the frame stops being so arranged as to cooperate with each other and the spring to normally swing the jaws away from the cutters, and enable the jaws to be swung to bring the work edgewise into the cutters and move to a position under the pull of the cutters on the work such that a true circle will be cut in the work.

14. In combination in a sheet metal working machine, rotary cutters, a carriage, an attachment frame pivotally mounted on the carriage, work supporting jaws on the frame, spaced stops on the frame, a spring on the carriage, and stops on the spring, the spring stops and the frame stops being so arranged as to cooperate with each other and the spring to normally swing the jaws away from the cutters, and enable the jaws to be swung to bring the work edgewise into the cutters and move to a position under the pull of the cutters on the work such that a true circle will be cut in the work, spaced guides fixed to the carriage, hollow blocks slidably mounted in the guides, the ends of the spring being held with the hollows of the blocks.

15. In combination in a sheet metal working machine, rotary cutters, a carriage, an attachment frame pivotally mounted on the carriage, work supporting jaws on the frame, spaced stops on the frame, a spring on the carriage, and stops on the spring, the spring stops and the frame stops being so arranged as to cooperate with each other and the spring to normally swing the jaws away from the cutters, and enable the jaws to be swung to bring the work edgewise into the cutters and move to a position under the pull of the cutters on the work such that a true circle will be cut in the work, spaced guides fixed to the carriage, hollow blocks slidably mounted in the guides, the ends of the spring being held with the hollows of the blocks, and means on the blocks cooperating with the guides to limit the amount of movement of the blocks in the guides.

16. In a circle cutting attachment for rotary shears having rotary cutters, a base, a carriage longitudinally adjustable on the base, an attachment frame pivotally mounted on the carriage for lateral swinging movement thereon, a pair of stop members secured to the frame in spaced relation, a spring on the carriage, a pair of stops on said spring cooperating with the stop members on the frame, so that the spring will normally hold the work laterally away from the cutters but enable it to be pushed edgewise into the cutters and the pull of the cutters on the work hold the work in position to cut a true circle.

17. In a circle cutting attachment for rotary shears having rotary cutters, a base, a carriage longitudinally adjustable on the base, an attachment frame pivotally mounted on the carriage for lateral swinging movement thereon, a pair of stop members secured to the frame in spaced relation, a spring on the carriage, a pair of stops on said spring cooperating with the stop members on the frame, so that the spring will normally hold the work laterally away from the cutters but enable it to be pushed edgewise into the cutters and the pull of the cutters on the work hold the work in position to cut a true circle, one of the stop members on the frame being adjustable to a different position closer to its companion stop member to convert the attachment into one for cutting a true circle in a blank sheet by starting the cut by causing one of the cutters to pierce the sheet instead of starting the cut from the edge of the sheet.

18. In a circle cutting attachment for rotary shears, a base, a carriage longitudinally adjustable on the base, an attachment frame pivotally mounted on the base, a pair of rotatable workholders, one of said holders being supported on a slidable clamping jaw, a shaft having a pair of spaced arms fixed thereto, a connecting rod pivotally connecting one of said arms with the clamping jaw to move the same to and from clamping position, and power means connected to the other of said arms for oscillating the shaft for operating the clamping jaw.

19. In a multiple circle cutting attachment for rotary shears having rotary cutters, a base, a carriage, a frame pivotally mounted on the carriage, a plurality of radially extending arms on the frame, a pair of rotatable workholders on each of the arms, means for clamping and unclamping work between the workholders, the pivot of the frame being to one side of a line passing through the cutting point of the cutters and parallel with the longitudinal axis of the attachment, the vertical axis of the workholders being located to one side of a line connecting the pivot center with the cutting point of the cutters in the arm of which the blank sheet is being cut, whereby the pull of the cutters on the sheet will automatically locate the parts in correct position for cutting a true circle, and friction slip drive means for rotating the frame to successively bring the blank sheets edgewise into the cutters and cut a true circle therein, other arms being loaded and unloaded with blank sheets while one is being cut whereby to speed up production.

HENRY COLLIER SMITH, Jr.